United States Patent
Park

(10) Patent No.: US 6,374,245 B1
(45) Date of Patent: Apr. 16, 2002

(54) SERVER SYSTEM COMMUNICATING WITH PERSONAL DIGITAL ASSISTANT AND COMMUNICATION METHOD THEREOF

(75) Inventor: Hee-young Park, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/041,024

(22) Filed: Mar. 12, 1998

(30) Foreign Application Priority Data

Apr. 10, 1997 (KR) .......................................... 97-13218

(51) Int. Cl.[7] .............................................. G06F 17/30
(52) U.S. Cl. ............................ 707/10; 707/9; 707/104; 709/217; 709/227; 709/229; 709/232
(58) Field of Search ......................... 707/232, 70, 104, 707/4, 201, 202, 203; 709/218, 217, 227, 229; 705/2, 3, 26

(56) References Cited

U.S. PATENT DOCUMENTS 5,379,057 A * 1/1995 Clough et al. ............... 345/173
5,497,339 A * 3/1996 Bernard ....................... 708/109

(List continued on next page.)

FOREIGN PATENT DOCUMENTS

| EP | 0 555 881 | 8/1993 | |
|---|---|---|---|
| JP | 2-3847 | 1/1990 | ........... G06F/13/00 |
| JP | 8-241277 | 9/1996 | ........... G06F/15/00 |
| WO | WO 97/09682 | 3/1997 | ........... G06F/17/30 |

OTHER PUBLICATIONS

Moeller Michael, "Connectivity Kit makes it easier to link Newton PDAs, desktops", PC Week, V12, n30, p31 (1), Jul. 31, 1995.*

PCWave, 5[3] (1997), Rasseru K.K. pp. 61–64.

Primary Examiner—Jean M. Corrielus
(74) Attorney, Agent, or Firm—Sughrue Mion, PLLC

(57) ABSTRACT

A server system communicating with a personal digital assistant (PDA), and a communication method thereof. In a system including a server system for generating and storing files to be distributed to a plurality of users, a data transceiver connected to the server system, and the PDA connected to the data transceiver, for transmitting and receiving the data of the server system, the server system includes: a data portion for storing all files; a selector for selecting files to be downloaded to the PDA from among the files provided by the data portion, according to the command of a user; a file storage portion for storing the files selected by the selector; and a controller for classifying the files selected by the selector according to users, storing the files by user in different directories of the file storage portion, and when a user wishes, downloading only files stored in the user directory of the file storage portion to the user's PDA. Therefore, when the PDA user wants to generate a new file or change an existing file, files are selectively downloaded from the server system, and files which are unnecessary for the user are deleted from the PDA, thereby efficiently using the limited PDA memory.

4 Claims, 4 Drawing Sheets

U.S. PATENT DOCUMENTS

| | | | | |
|---|---|---|---|---|
| 5,522,089 A | * | 5/1996 | Kikinis et al. | 395/893 |
| 5,537,343 A | * | 7/1996 | Kikinis et al. | 364/708.1 |
| 5,547,401 A | * | 8/1996 | Aldous et al. | 439/676 |
| 5,588,148 A | | 12/1996 | Landis et al. | 395/601 |
| 5,644,766 A | * | 7/1997 | Coy et al. | 707/204 |
| 5,675,362 A | * | 10/1997 | Clough et al. | 345/173 |
| 5,694,546 A | * | 12/1997 | Reisman | 395/200.9 |
| 5,696,900 A | * | 12/1997 | Nishigaya et al. | 395/200.01 |
| 5,721,827 A | * | 2/1998 | Logan et al. | 709/217 |
| 5,732,216 A | * | 3/1998 | Logan et al. | 709/203 |
| 5,761,485 A | * | 6/1998 | Munyan | 345/350 |
| 5,793,966 A | * | 8/1998 | Amstein et al. | 709/203 |
| 5,794,230 A | * | 8/1998 | Horadan et al. | 707/2 |
| 5,819,284 A | * | 10/1998 | Farber et al. | 707/104 |
| 5,822,230 A | * | 10/1998 | Kikinis et al. | 364/708.1 |
| 5,835,732 A | * | 11/1998 | Kikinis et al. | 395/281 |
| 5,845,282 A | * | 12/1998 | Alley et al. | 707/10 |
| 5,845,303 A | * | 12/1998 | Templeman | 707/517 |
| 5,857,201 A | * | 1/1999 | Wright et al. | 707/104 |
| 5,862,321 A | * | 1/1999 | Lamming et al. | 395/200.3 |
| 5,867,821 A | * | 2/1999 | Ballantyne et al. | 705/2 |
| 5,873,108 A | * | 2/1999 | Goyal | 707/507 |
| 5,974,446 A | * | 10/1999 | Sonnenreich et al. | 709/204 |
| 5,982,520 A | * | 11/1999 | Weiser et al. | 359/172 |
| 5,987,510 A | * | 11/1999 | Imai et al. | 709/219 |
| 6,115,715 A | * | 9/2000 | Traversat | 707/100 |

* cited by examiner

SERVER SYSTEM COMMUNICATING WITH PERSONAL DIGITAL ASSISTANT AND COMMUNICATION METHOD THEREOF

BACKGROUND OF THE INVENTION

1. Field of the Invention

The present invention relates to a server system communicating with a personal digital assistant (PDA) and a communication method thereof, and more particularly, to a server system communicating with a PDA, which allows files to be selectively downloaded from the server system to the PDA, and a communication method thereof.

2. Description of the Related Art

Since a PDA includes a central processing unit (CPU), a memory, an input/output device, etc., the PDA processes information by itself, and uploads and downloads file and data on demand when connected to a server system.

In general, a communication system between a PDA and a server system includes a main server, a sub-server connected to the main server via a network, a data transceiver connected to the sub-server, a PDA portion having a plurality of PDAs each connected to a port of the data transceiver, and a PDA connected to another side of the sub-server via a public network in the same manner as the PDA portion. Here, the PDA portion and the PDA can communicate with each other via the public network.

FIG. 1 is a flowchart illustrating a conventional communication method with a PDA.

Referring to FIG. 1, if a file taken from a main server via a file transfer protocol (FTP) corresponds to notice board information distributed to all PDA users (step 100), or is a common file required for all PDA users (step 102), the file is stored in a common file directory (step 104). The file in the common file directory is used for initializing the PDA, and is downloaded to each PDA via the data transceiver.

A file for only a specific user is stored in an individual file directory (step 106), and downloaded to the PDA via the data transceiver when the user initializes their own PDA.

However, in the above communication method using the PDA, when the information content stored in the PDA is changed or the amount of data to be stored in the PDA is increased by adding new information thereto, all files or data cannot be stored due to a limited memory size (about 20MByte) of the PDA. In addition, all files or data are downloaded, regardless of whether the PDA user needs them.

SUMMARY OF THE INVENTION

To solve the above problems, it is an object of the present invention to provide a server system communicating with a personal digital assistant (PDA), and a communication system thereof, wherein the PDA is capable of selectively downloading files or data from a server, thereby efficiently using the limited memory of the PDA.

According to an aspect of the above object, there is provided a system including a server system for generating and storing files to be distributed to a plurality of users, a data transceiver connected to the server system, and the PDA connected to the data transceiver, for transmitting and receiving the data of the server system, wherein the server system comprises: a data portion for storing all files; a selector for selecting files to be downloaded to the PDA from among the files provided by the data portion, according to the command of a user; a file storage portion for storing the files selected by the selector; and a controller for classifying the files selected by the selector according to users, storing the files by user in different directories of the file storage portion, and when a user wishes, downloading only files stored in the user directory of the file storage portion to the user's PDA.

According to another aspect of the above object, there is provided a communication method between a personal digital assistant (PDA) and a server system in a system including the server system for generating and storing files to be distributed to a plurality of users, a data transceiver connected to the server system, and the PDA connected to the data transceiver, for transmitting and receiving the data of the server system, the communication method comprising the steps of: (a) storing files of the server system in the directories of all users, if the files are required by all users; (b) storing files of the server system in a common directory, if the files are new or changed; (c) selecting a file among files of the server system for a PDA user to download to the PDA of a user; (d) finding out the files selected in the step (c) in the common directory and storing the found files in a user's directory; and (e) connecting the PDA to the data transceiver and downloading the file stored in the user's directory of the server system.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
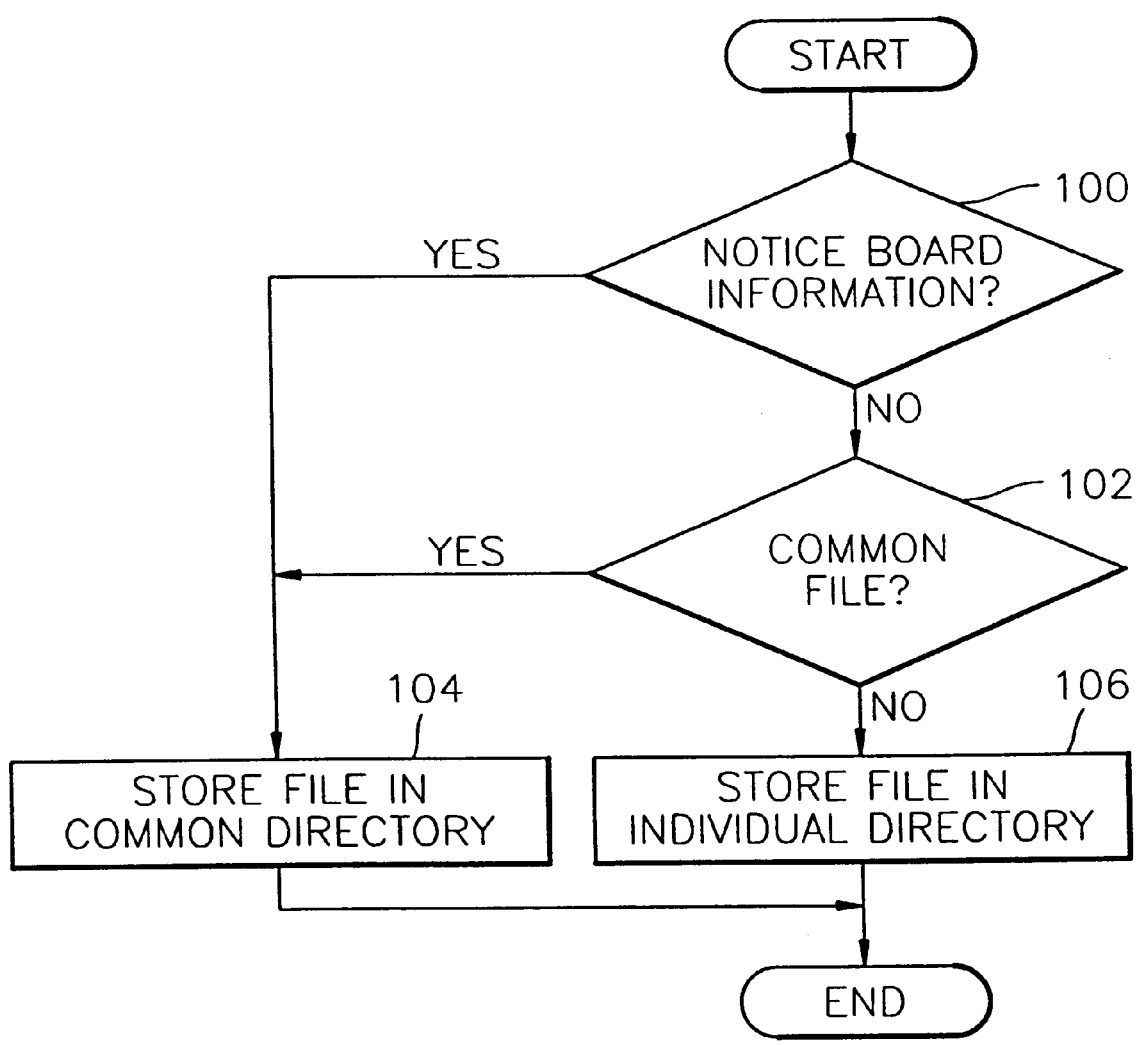
FIG. 1 is a flowchart illustrating a conventional communication method with a personal digital assistant (PDA)
Figure 2:
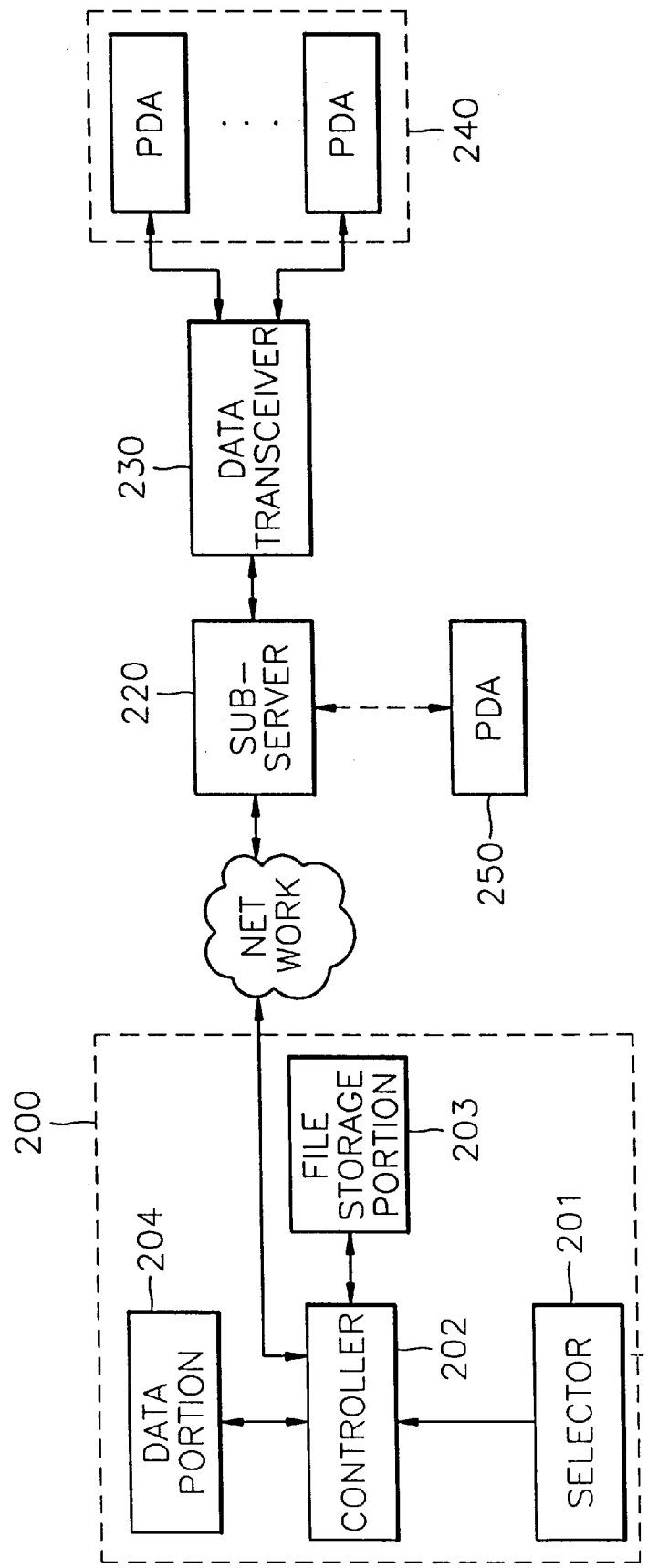
FIG. 2 is a block diagram of a communication system for saving to/from the memory of a PDA according to the present invention.

Referring to FIG. 2, a server system communicating with a personal digital assistant (PDA) includes a main server 200, a sub-server 220 connected to the main server 200 via a network, a data transceiver 230, a PDA portion 240 having a plurality of PDAs each connected to a port of the data transceiver 230, and a PDA 250 connected to the sub-server via a public network in the same manner as the PDA portion 240. Here, the PDA portion 240 can communicate with the PDA 250 located at a remote site, via the public network.

Data is transferred between the main server and the sub-server 220 on demand by a file transfer protocol (FTP). The data transceiver 230, an input/output device, is connected to the sub-server 220, and the plurality of PDAs of the PDA portion 240 are each connected to a port of the data transceiver 230, thereby performing communications. Here, an FTP program stores the data taken from the main server 200 in a sub-server 220, and transfers the data from the PDA 250 or sub-server 220 to the main server 200.

The main server 200 includes a selector 201, a controller 202, a file storage portion 203 and a data portion 204. A PDA user inputs his own identity (ID) and selects a desired file or data to be downloaded using the selector 201. The controller 202 checks the size of the file or data selected by the selector 201, to determine whether the size of the file or data can be accommodated by the corresponding PDA, and stores the file or data read from the data portion 204 in the corresponding directories, classified by the user, of the file storage portion 203. The directory of the file storage portion 203 includes an INS directory for storing information on file changes and new files, and a DLT directory for storing a list of files to be deleted. Also, the controller 202 communicates with the sub-server 220.

Figure 3:
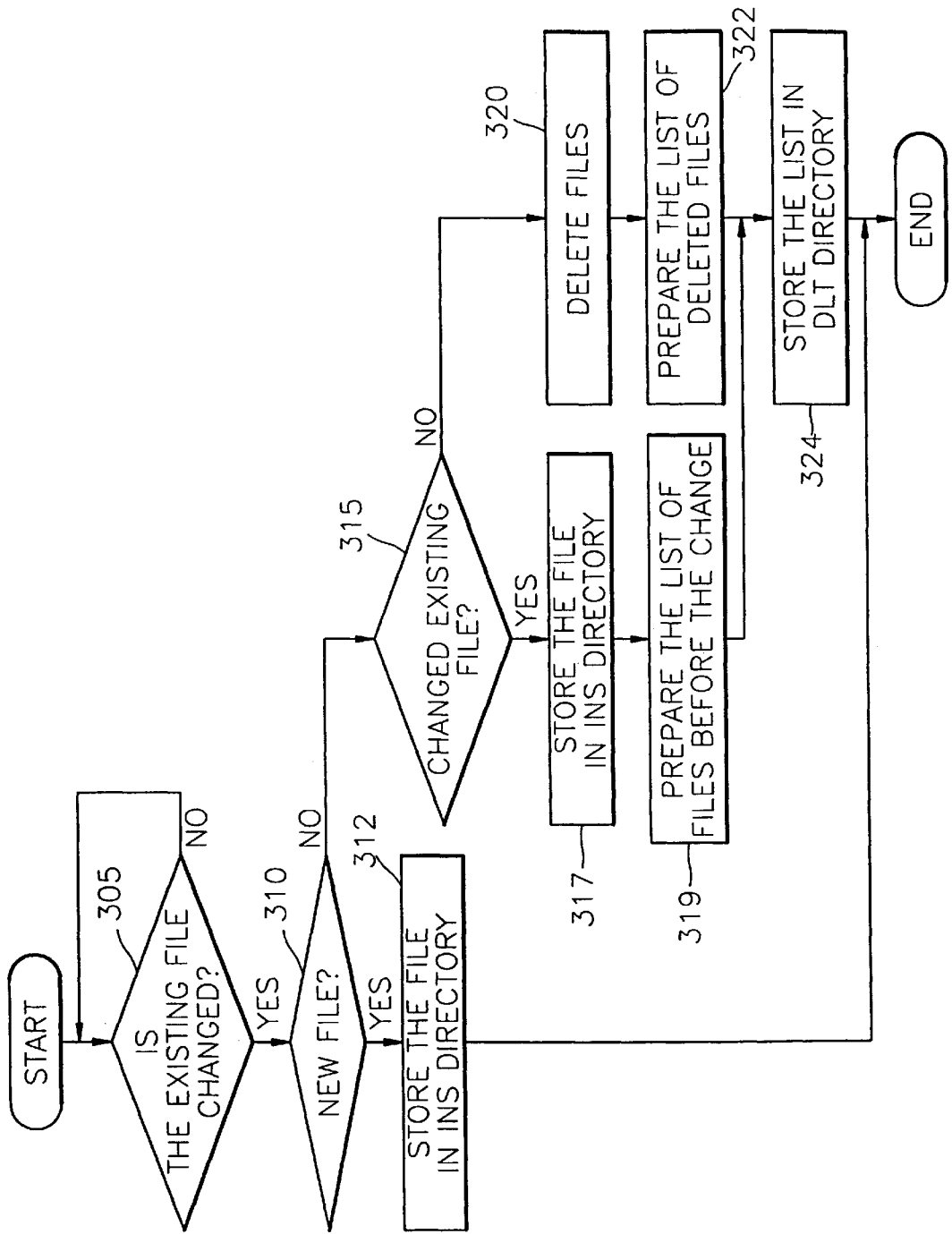
FIG. 3 is a flowchart illustrating the operation of a main server according to the present invention.

FIG. 3 is a flowchart illustrating an example of the operation of the main server 200 according to the present invention. In this example, a sales person of an insurance company, one of the main users of the PDA, selectively downloads data of insurance products from the server using the PDA.

First, it is checked whether there is a change in an existing file (step 305). That is, it is checked whether there is change in a file of the insurance products. If the change was detected in the step 305, it is checked whether the change is the generation of a new file (step 310). If a new file is generated, the new file is stored in the INS directory (step 312). That is, if there is a change in the file relating to new insurance products which must be distributed to each PDA user (i.e. insurance sales person), the file of the new products is stored in the INS directory.

However, if the change is caused by the change of an existing file, not the generation of a new file, (step 315), the changed file is stored in the INS directory (step 317), and then the list of files before the change is prepared (step 319).

Also, if it is determined in the step 315 that the change is not caused by the change of an existing file, the existing files are deleted (step 320). That is, all existing files which are unnecessary for the insurance sales person are deleted. Then, the list of the files deleted in step 320 is prepared (step 322), and the list of the files before the change, prepared in the step 319, or the list of the files deleted, prepared in the step 322, are stored in the DLT directory (step 324).

A PDA user can select whether to receive or delete a file stored in each directory or the existing files. That is, the PDA users can view all files of insurance products which can be selected by the selector 201 connected to the main server 200, and the files of the insurance products which are currently used by the PDA user. The users can add new files of insurance products or delete files, upon submission of a predetermined key and their ID number. Here, the main server 200 checks whether the size of the program and data file relating to the selected file of the insurance products is acceptable for the PDA. Then, if the size exceeds the memory capacity of the PDA, the fact is indicated to the user.

Figure 4:
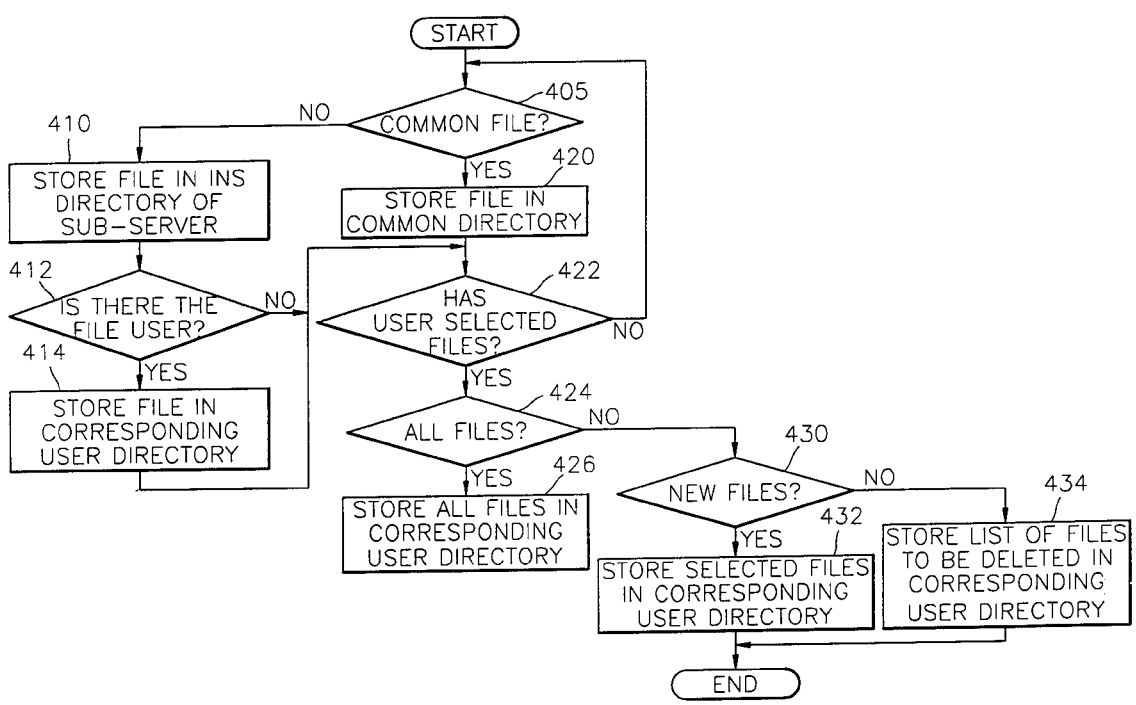
FIG. 4 is a flowchart illustrating data distribution and processing by a sub-server according to the present invention.

FIG. 4 is a flowchart illustrating data distribution and processing by the sub-server 220.

Referring to FIG. 4, first, it is checked whether a file taken from the main server 200 is a common file (step 405). If the file is not a common file, the file is stored in an INS directory of the sub-server 220 (step 410). After the step 410, it is checked whether there is a user of the file stored in the INS directory (step 412). If there is a user of the file, the file is stored in the directory of the user using the file (step 414).

If it is determined in the step 405 that the file is a common file, the file is stored in a common directory (step 420). Then, it is checked whether the user has selected a file to be stored in his own PDA (step 422). If so, it is checked whether the user has selected all files (step 424). If the user selected all files in the step 424, all the files are stored in the directory of the user (step 426).

If the user has not selected all the files in the step 424, it is checked whether the user selects a new file (step 430). If so, the selected new file is stored in the directory of the user (step 432). If the user had not selected a new file in the step 430, the list of files to be deleted is stored in the directory of the user (step 434).

The sub-server 220 periodically contacts the main server 200 using FTP to check a specific directory of the main server 200, e.g. INS and DLT directories. If a file exists in these directories, the sub-server 220 takes the file from the directories, and performs the steps illustrated in FIG. 4.

If the file taken into the sub-server 220 is a common file to be distributed to all users (step 405), the file is stored in a common directory of the sub-server 220 (step 420). However, if the file stored in the sub-server 220 is a file in the INS directory, not a common file, that is, a file relating to new or modified insurance products, the file is stored in the INS directory of the sub-server 220 (step 410). If the file is in use (step 412), the files are stored in the directory of the user (step 414). A common file in the DLT directory of the main server 200 is stored in the common directory of the sub-server 220 (step 420). Referring to the list of files stored in the DLT directory, the corresponding files of the PDA are deleted. It is checked whether a user selects files to be downloaded (step 422). If the user selects the list of all products in order to initialize the PAD (step 424), all files of insurance products of the main server 200 are stored in the directory of the user (step 426). Here, initializing the PDA means deleting all files in the PDA and receiving new files downloaded from the sub-server 220. If the user selects new files instead of all files of products (step 430), the selected files are found from the INS directory of the sub-server 220 and stored in the directory of the user (step 432). If the user wants to delete files, the list of files to be deleted are stored in the directory of the user (step 434).

When the file distribution and process are completed in the sub-server 220, a PDA user connects his own PDA to the data transceiver 230, thereby downloading the files of the directories, and deleting the corresponding files of the PDA with reference to the list of the files stored in the DLT directory or the files which the user selects to delete.

In the server system communicating with the PDA and the communication method thereof according to the present invention, when the PDA generates a new file or changes an existing file, files provided by the server system are selectively downloaded to the PDA, and files which are unnecessary for a user are deleted from the PDA. As a result, the limited memory of the PDA can be used effectively.

What is claimed is:

1. A system including a server system for generating and storing files to be distributed to a plurality of users, a data transceiver connected to the server system, and a personal digital assistant (PDA) connected to the data transceiver for transmitting and receiving data of the server system, wherein the server system comprises:

a data portion for storing the files;

a controller for determining which of the files stored in the data portion are new or changed;

a selector for selecting, according to user command, from among the files which are new or changed, a plurality of files to be downloaded to the PDA from the data portion; and a file storage portion for storing the plurality of files selected by the selector;

wherein the controller classifies each of the plurality of files selected by the selector according to user, stores each of the plurality of files by user in different directories of the file storage portion, and when a particular user wishes, downloads only files stored in the directory of the particular user to the PDA associated with the particular user.

2. A communication method between a personal digital assistant (PDA) and a server system in a system including the server system for generating and storing files to be distributed to a plurality of users, a data transceiver connected to the server system, and the PDA connected to the data transceiver, for transmitting and receiving the data of the server system, the communication method comprising the steps of:

(a) determining which of the files of the server system are required by all the users;

(b) storing the files of the server system which are determined to be required by all of the users in the directories of all of the users;

(c) determining which of the files of the server system are new or changed;

(d) storing the files of the server system which are determined to be new or changed in a common directory;

(e) selecting, by a first user, from among the files of the common directory at least one file for a PDA of the first user to download to the PDA of the first user;

(f) storing the at least one file selected in the step (e) in a directory of the first user; and (g) connecting the PDA of the first user to the data transceiver and downloading the at least one file stored in the directory of the server system of the first user to the PDA of the first user.

3. The communication method of claim 2, further comprising the steps of:

(f) preparing a first list of files to be commonly deleted, and storing the first list in the directories of all of the users;

(g) preparing a second list of files to be deleted among the files stored in a PDA of a second user, and storing the second list of files in the directory of the second user; and (h) connecting the PDA of the second user to the data transceiver, receiving the lists of files to be deleted and deleting the files included in the lists from the PDA of the second user.

4. The communication method of claim 3, wherein the first and second users are the same.

* * * * *